United States Patent [19]
Pinckaers

[11] 3,824,439
[45] July 16, 1974

[54] ELECTRONIC STROKE ADJUST FOR MOTOR CONTROL

[75] Inventor: B. Hubert Pinckaers, Edina, Minn.

[73] Assignee: Honeywell Inc., Minneapolis, Minn.

[22] Filed: Feb. 14, 1973

[21] Appl. No.: 332,463

[52] U.S. Cl. ............................. 318/667, 318/668
[51] Int. Cl. ............................................. G05b 1/06
[58] Field of Search ........... 318/609, 610, 666, 667, 318/668, 663, 674

[56] References Cited
UNITED STATES PATENTS
2,403,917  7/1946  Gille .............................. 318/667 X
2,813,235  11/1957  Clay ............................... 318/668 X Primary Examiner—T. E. Lynch
Attorney, Agent, or Firm—Lamont B. Koontz; Omund R. Dahle

[57] ABSTRACT

An improved condition control system including an electrical bridge circuit for controlling a motor which in turn positions a valve or damper. The motor also drives a wiper on a valve position feedback potentiometer. The valve feedback potentiometer is specifically placed in the bridge network in series with a further resistor so that an electrical voltage center occurs in the bridge at one end of the potentiometer. A stroke adjust variable resistance is connected in parallel with the series connected feedback potentiometer and further resistor to provide an electronic valve stroke length adjust. In adjusting stroke length only the open position of the valve is controlled while the closed position of the valve, i.e., at the electrical voltage center, is not affected.

3 Claims, 5 Drawing Figures

PATENTED JUL 16 1974  3,824,439

ELECTRONIC STROKE ADJUST FOR MOTOR CONTROL

BACKGROUND AND SUMMARY OF THE INVENTION

This invention lies in the field of closed loop motor controllers in which the existence of an electrical error signal in a bridge circuit causes a motor to run to adjust a load device and also to adjust the wiper of a feedback potentiometer to thereby reduce the error signal toward zero. This invention further lies in the field of such motor control circuits which have an electronic stroke adjustment connected in a circuit with the feedback potentiometer to control the amount of motor operation which is required to rebalance the bridge circuit. Electronic stroke adjustment is generally shown in such representative U.S. Pat. Nos. as 2,403,917; 2,435,966; 2,474,441; 2,758,269 and 2,813,235.

In the present invention, the motor controls the position of a valve, damper, or the like from a "closed" position to an "open" position. The improved electronic stroke adjust allows the adjustment of the open position for a given control signal without any change of the closed position, that is, only one end of the stroke is adjusted, the other (closed) end remaining fixed.

DESCRIPTION

Figure 1:
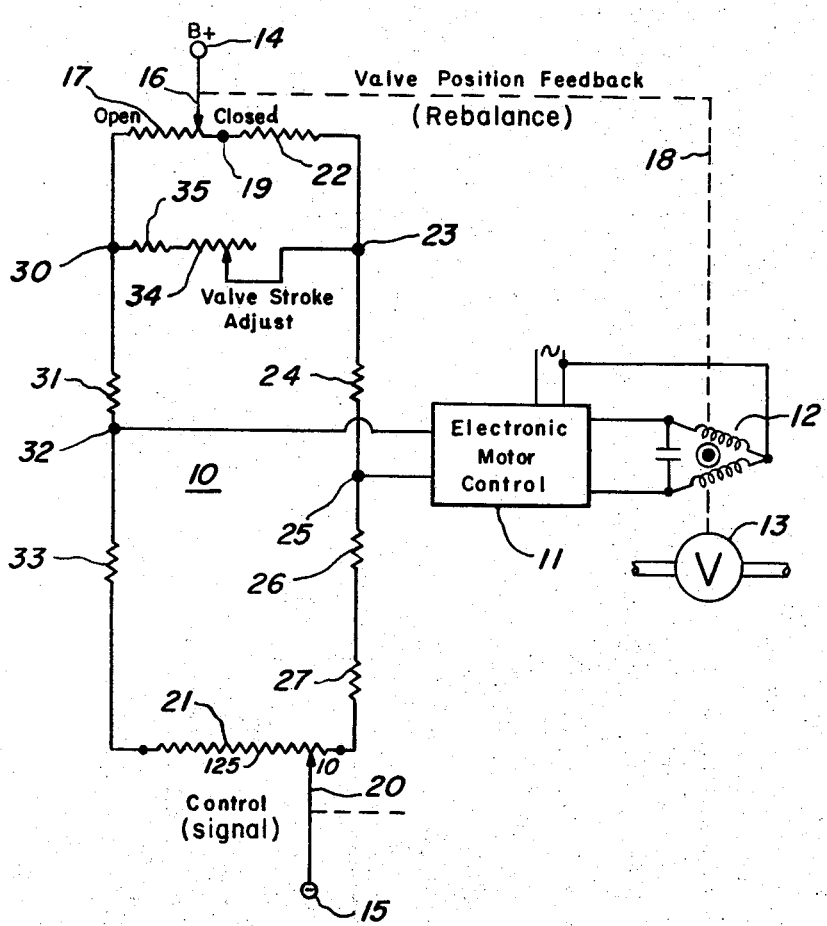
FIG. 1 is a schematic representation of a preferred embodiment of the invention.

Referring now to FIG. 1 there is generally disclosed a closed loop motor control circuit in which the electrical output signal from a bridge 10 is connected to an electronic motor control means 11 which controls the operation of a reversible motor 12 to position a valve 13 and the wiper 16 of a feedback potentiometer in the bridge. The electronic motor control means 11 and motor means 12 may be of the general type disclosed in my copending U.S. Pat. application Ser. No. 273,245, filed July 19, 1972 entitled "Condition Controlled Reversible Motor System." The reversible motor means 12 is of a well known type of shaded pole reversible motor which is commercially available from Honeywell Inc. and is known as the M934 type of motor. The specifically recited motor is only one of many types of reversible motors which could be used in the present invention, and the reference is being supplied merely as a matter of convenience.

Referring now specifically to the bridge 10, there is disclosed a pair of bridge power input terminals 14 and 15, with the terminal 14 being connected to the wiper 16 of a feedback potentiometer 17, and the terminal 15 being connected to the wiper 20 of a control potentiometer 21. Electrical power is supplied to the bridge through the wiper contacts 16 and 20. The right hand terminal of potentiometer 17, i.e., junction 19, is connected through a resistor 22, a junction 23, a resistor 24, an output terminal 25, a resistor 26, and a resistor 27 to the right hand terminal of control potentiometer 21. The left hand terminal of potentiometer 17 is connected to a junction 30, a resistor 21, an output terminal 32, and a resistor 33 to the left hand terminal of potentiometer 21. From junction 23 a circuit can be traced through a valve stroke adjust potentiometer 34 and a resistor 35 to the junction 30. Bridge signal output terminals 25 and 32 are connected to the input terminals of the electronic motor control 11 as previously mentioned.

In one embodiment of this invention the following component values were used in the bridge circuit.

| | |
|---|---|
| Resistor 22 | 600 ohms |
| Resistors 24, 26, 31, 33 | 2K ohms |
| Resistor 27 | 115 ohms |
| Resistor 35 | 316 ohms |
| Potentiometer 17 | 600 ohms |
| Potentiometer 21 | 135 ohms |
| Potentiometer 34 | 375 ohms |

It will be noted that the bridge circuit above described is symmetrical in construction. The mechanical link 18 which provides the valve position feedback to wiper 16 is arranged so that when the valve 13 is in a closed position the wiper 16 is at the right hand end 19 of potentiometer 17. The right hand end of potentiometer 17 may be properly called the "virtual center" position of the bridge 10. In this position the symmetry of the bridge can be clearly seen, as resistor 22 and potentiometer 17 are alike, resistors 24 and 26 match resistors 31 and 33, resistor 27 and the first 10 ohms of potentiometer 21 match the remainder of potentiometer 21. An extremely important feature of this invention is that the wiper 16 of the potentiometer 17 is at the virtual center position when the valve is closed.

Figure 2:
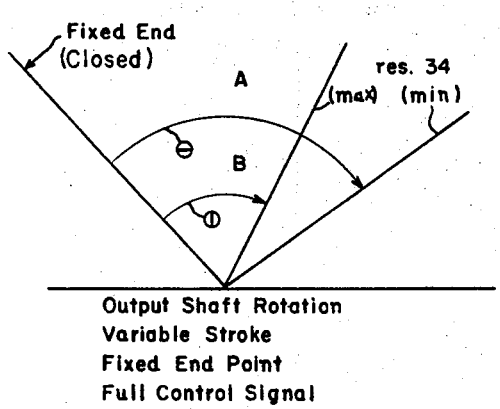
FIG. 2 is a graphical presentation of certain operating characteristics of the apparatus of FIG. 1.

In this invention stroke length adjustment is easily accomplished by the setting of the single control 34. When the setting of valve stroke adjust potentiometer 34 is at a maximum resistance setting, i.e., 375 ohms, a smaller stroke of the potentiometer wiper 16 (and thus of the valve also) is required to rebalance the bridge than when the setting of potentiometer 34 is at a lower resistance setting. FIG. 2 is a representation of the magnitude of the response required by motor 12, valve 13 and wiper 16 to rebalance the bridge 10, for two different settings of valve stroke adjust potentiometer 34, when the control potentiometer wiper 20 has been moved from the shown position to a new position a predetermined distance away along element 21. The larger arc A of response shown in FIG. 2 is one in which the resistance of potentiometer 34 is set at a smaller value than is the case of arc B. Thus in order to rebalance the same error or signal potential in the two instances, the motor, valve and wiper 16 had to drive farther with the lower setting of 34. At all settings of potentiometer 34 it should be noted that only open positions of the valve are affected as shown in FIG. 2. The fixed end of the stroke, that is, the closed position of the valve, which corresponds to the wiper 16 at the right hand end 19 of potentiometer 17, is not affected no matter what adjustment is made to stroke adjust potentiometer 34.

Another way of explaining the action of the bridge is that when the bridge is balanced at the closed position of the valve, the wiper 16 being at the right of potentiometer 17, the bridge 10 is symmetrical, and the potentials at terminals 23 and 30 are the same. With equal potentials at terminals 23 and 30, no current flows in the shunt comprising resistors 35 and valve stroke adjust potentiometer 34, whereby this shunt has no effect on the bridge at any setting of potentiometer 34. Thus the closed position of the valve is not changed by the setting of potentiometer 34. Let it now be assumed, for explanatory purposes, that the position of wiper 20 of the control potentiometer has moved towards the left causing the motor to drive valve 13 open and wiper 16 to move toward the left end of potentiometer 17 to rebalance. In the limit condition in which wiper 16 is at the far left, it can be seen that the bridge, which is energized at wiper 16, is no longer symmetrical. Now the shunt circuit 34, 35 is clearly and effectively in parallel with potentiometer impedance 17 and resistor 22 and current flows to the right to junction 23 through both parallel branches. The impedance of the parallel circuit, in that limit case, is (17 + 22) (35 + 34)/17 + 22 + 35 + 34 and the setting of valve stroke adjust potentiometer 34 now clearly adjusts the value of this impedance. This adjustable branch is itself in series with resistors 24, 26, 27 and part of 21 to form a voltage divider. As the wiper 16 is moved progressively back towards the right, the bridge progressively approaches symmetry and the shunt circuit progressively loses its effect. The overall result is that for any given position of wiper 20 and wiper 16, other than at the closed position previously discussed, the smaller the resistive setting of potentiometer 34, the smaller will be the signal potential across terminals 25 and 32.

Figure 3:
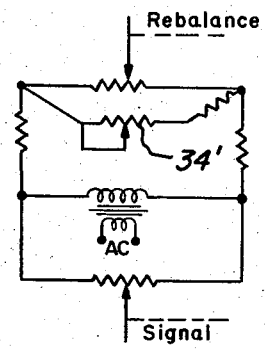
FIGS. 3 and 4 are schematic representations of prior art.
Figure 4:
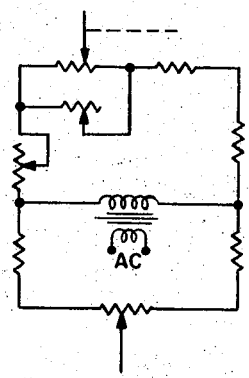
Figure 5:
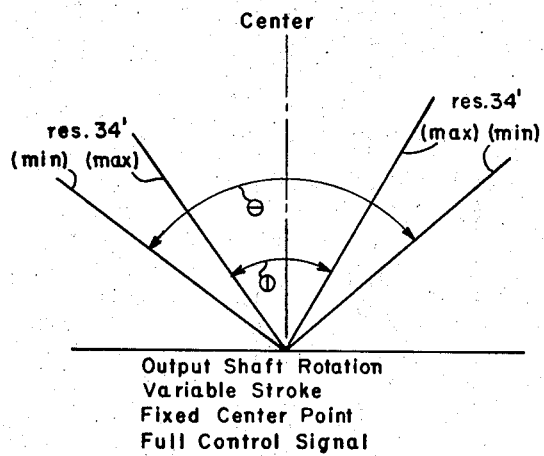
FIG. 5 is a graphical presentation of certain operating characteristics of the prior art.

In constrast to the operation of the present invention as shown and described in reference to FIGS. 1 and 2, the known prior art as shown in FIGS. 3 and 4 is energized from the transformer and the signal output to the amplifier is from the wipers of the signal and rebalance potentiometer. The variable stroke shunt potentiometer in these figures causes an operation such as is shown in FIG. 5 wherein both ends of the stroke are shortened or extended when adjustment is made. This prior art arrangement is clearly not suitable for use where one end of the stroke is a valve closed position and requires a fixed position.

The embodiments of the invention in which an exclusive property or right is claimed are defined as follows:

1. An improved bridge circuit for use in a position feedback motor control system for adjusting valve means in which the valve stroke length for a given error signal is adjustable by the setting of a valve stroke adjust potentiometer without other recalibration of the bridge, the improved bridge circuit comprising:
   a pair of power input terminals;
   first and second signal output terminals;
   a rebalance potentiometer having a resistance element and a wiper contact adjustable along said resistance element, the resistance element being of a first predetermined resistive value and having first and second terminals;
   first resistive means also of said predetermined resistive value, said means having a first and second terminal;
   means connecting together the first terminals of said rebalance potentiometer resistive element and said first resistive means so that said resistive element and said first resistive means are in a series circuit;
   means for connecting said wiper contact to one of said power input terminals, whereby energy for said bridge circuit is applied to said bridge circuit through said wiper contact;
   second resistive means comprising a valve stroke adjust potentiometer connected in parallel with said series circuit;
   conductive means connecting said parallel combination of series circuit and second resistive means to first and second bridge output terminals, said first and second output terminals being connected in controlling relation to reversible motor means, which motor means is adapted to be mechanically coupled to adjust the position of valve means from a closed position at one extreme to any of a series of non-closed positions;
   third resistive means comprising control potentiometer means having a resistive element and a wiper contact adjustable along said resistive element, said wiper contact being connected to the other of said bridge power input terminals, said wiper contact being adjusted along the resistive element as a function of a condition to be controlled, said resistive means being connected to said bridge output terminals;
   and means connecting said motor means to said rebalance potentiometer wiper contact such that when said valve is closed said wiper contact is at the end of said resistive element adjacent said first terminal.

2. The invention according to claim 1 in which said conductive means comprises fourth and fifth resistive means, the fourth resistive means connecting one end of said series circuit to the first bridge output terminal and the fifth resistive means connecting the other end of said series circuit to the second bridge output terminal.

3. The invention according to claim 1 in which said third resistive means also includes at least one resistor between each end of the control potentiometer element and the bridge output terminal to which that end is connected.

* * * * *